United States Patent [19]
Bentley

[11] Patent Number: 5,499,156
[45] Date of Patent: Mar. 12, 1996

[54] FORCED, RESONANT DEGAUSSING SYSTEM AND METHOD

[75] Inventor: Robert M. Bentley, Hacienda Heights, Calif.

[73] Assignee: Hughes Aircraft Company, Los Angeles, Calif.

[21] Appl. No.: 341,727

[22] Filed: Nov. 18, 1994

[51] Int. Cl.$^6$ ..................... H04N 9/29
[52] U.S. Cl. ............... 361/150; 315/8
[58] Field of Search ................. 361/139, 149, 361/150; 315/8

[56] References Cited

U.S. PATENT DOCUMENTS

| | | | |
|---|---|---|---|
| 4,737,881 | 4/1988 | Haferl | 361/150 |
| 4,829,214 | 5/1989 | Lendaro | 361/150 |
| 5,170,096 | 12/1992 | Kang et al. | 361/150 |
| 5,287,242 | 2/1994 | Kamimura | 361/150 |
| 5,404,084 | 4/1995 | Onodera et al. | 361/150 |

FOREIGN PATENT DOCUMENTS 0134585  7/1985  Japan ..................... 361/150

*Primary Examiner*—Jeffrey A. Gaffin
*Attorney, Agent, or Firm*—Georgann S. Grunebach; Wanda K. Denson-Low

[57] ABSTRACT

A degaussing system for color monitors is disclosed. During a degaussing cycle, the system successively reverses the coupling in a bridge circuit between a degaussing coil and a storage capacitor so as to generate oppositely directed degaussing currents through the coil. To insure that the residual magnetism after degaussing is substantially zero, feedback signals are developed in a feedback circuit and applied through a control circuit to the bridge circuit to successively decrease the coil's current magnitudes until they reach a predetermined threshold. Simultaneously, the feedback signals are adjusted to cause the time-integrated current in one direction of the coil to substantially equal the time-integrated current in the other coil direction.

20 Claims, 4 Drawing Sheets

FORCED, RESONANT DEGAUSSING SYSTEM AND METHOD

BACKGROUND OF THE INVENTION

1. Field of the Invention

The present invention relates generally to color display monitors and more particularly to the degaussing of color monitors.

2. Description of the Related Art

An ambient magnetic field can degrade the display of color monitors (cathode-ray tubes) because the magnetic field alters the screen landing point of the scanned electronic beams. In these monitors, phosphor dots of primary colors, e.g., red, green and blue, are typically deposited on the viewing screen in a pattern of dot triads with a phosphor dot of each color forming one-third of each triad. A scanned electron beam is generated for each color and when the dots are excited by their respective electron beams, they phosphoresce to produce a full-color picture. The dots are carried on a phosphor-dot faceplate which may be a portion of the picture tube itself or a separate internal glass plate.

One form of a beam-directing device is a shadowmask which is a thin perforated plate that is spaced inwardly from the phosphor-dot faceplate. Each aperture of the shadowmask is associated with a different one of the phosphor triads and is positioned to allow each dot of that triad to be excited only by its respective electron beam.

In accordance with Lorentz's Law, a deflecting force is imposed on the electrons of the electron beams as they pass through an ambient magnetic field. This deflecting force can cause the electron beams to become misaligned with their respective phosphor dots with consequent display color degradation, e.g., loss of color purity, picture rotation and picture translation.

Color display distortion is particularly troublesome in environments which have strong, changing magnetic fields, e.g., naval warships and medical magnetic resonance imaging (MRI). Although movement of naval warships through the earth's magnetic field is one source of magnetic distortion, a more powerful distortion source is the external magnetic field that is often purposely generated to oppose this natural field and thus hide the ship from enemy magnetic sensors, e.g., magnetically actuated mines.

To mitigate the distorting effects of ambient magnetic fields, color monitors typically include a metal shield that is positioned inside the monitor's cathode-ray tube. If the magnetic domains of this internal shield are initially oriented in opposition with the ambient magnetic field, that field is substantially reduced and the internal shield is effective in preventing undesirable electron beam deflection. If the ambient field then changes to a new orientation or magnitude, hysteresis effects in the internal shield will prevent complete realignment of its domains in opposition to the new orientation. Consequently, a remnant field exists that may be strong enough to cause significant misalignment of the electron beams with their respective phosphor dots.

The act of allowing the local domains of the internal shield and shadowmask to realign in opposition to the reoriented ambient magnetic field is referred to as degaussing (demagnetizing). Typical degaussing systems run alternating currents through a degaussing coil that is arranged to envelope the cathode-ray tube in its magnetic field. Monotonically reducing the initial high strength of this alternating field to a small value, prior to its termination, enhances the ability of the internal shield domains to realign in opposition to the ambient field.

In an exemplary system, a degaussing coil is arranged in series with a thermistor, an alternating voltage source (usually, the AC line voltage) and a switch. When the switch is closed, a sinusoidal current is sent through the degaussing coil. The magnetic field strength declines because the thermistor resistance increases as it is heated by the series current. The degaussing time of thermistor-based systems is typically slow, e.g., 1–3 seconds, because it is dictated by the thermistor thermal time constant. In addition, the time before these systems can be degaussed again is limited by the time it takes the thermister to cool down, e.g., 5 to 10 minutes.

Thermistor-based degaussing systems generally require considerable power, e.g., typical peak power of 1000 watts, and their high surge currents can cause electromagnetic interference (EMI) problems in associated circuits. In general, the performance parameters of thermistor-based systems are poorly defined because they are susceptible to variation in line voltage and variation of the thermistor resistance with ambient temperature.

Improved degaussing methods should be fast, e.g., <500 milliseconds, quickly repeatable, e.g., <10 seconds and efficient. Preferably, they should not require monitor blanking nor leave significant residual magnetism and they should minimize EMI production by avoiding high surge currents. They should be relatively insensitive to line voltage variations and temperature variations, inexpensive and compatible with a variety of monitors, e.g., commercial-off-the-shelf (COTS) monitors.

SUMMARY OF THE INVENTION

The present invention is directed to a fast, efficient degaussing method and system which can be quickly recycled and is relatively insensitive to temperature and supply voltage variations.

These goals are realized with a recognition that the coupling direction of a coil and an energy source can be successively reversed to generate successive currents through the coil in successively different directions, and that the energy source can resonantly receive after each successive reversal, at least a portion of the current generated in the coil in the preceding coupling. Thus, successive, differently oriented magnetic fields are generated while energy is resonantly exchanged between the coil and the energy source.

It is further recognized that each successive coupling reversal can be timed to successively reduce the magnitude of current that is generated through the coil in the preceding coupling, and that this timing can be adjusted to cause the time integrated current in one coil direction to substantially equal the time integrated current in the other coil direction. The successive reversing can be stopped when the current magnitude reached during any coupling drops below a predetermined threshold.

In a system embodiment, the coupling between an energy source (e.g., a storage capacitor) and a degaussing coil is successively reversed by a switching network to generate successive, oppositely directed currents through the coil and successive, differently oriented magnetic fields. A feedback circuit is configured to time the reversals in accordance with a comparison of current sense signals and a time-reducing reference signal, e.g., a ramp signal. The feedback circuit includes comparison networks which adjust the time-reducing reference in accordance with an integrator that is responsive to the current sense signals. The energy source is recharged through a current controlled switch to minimize the production of EMI.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
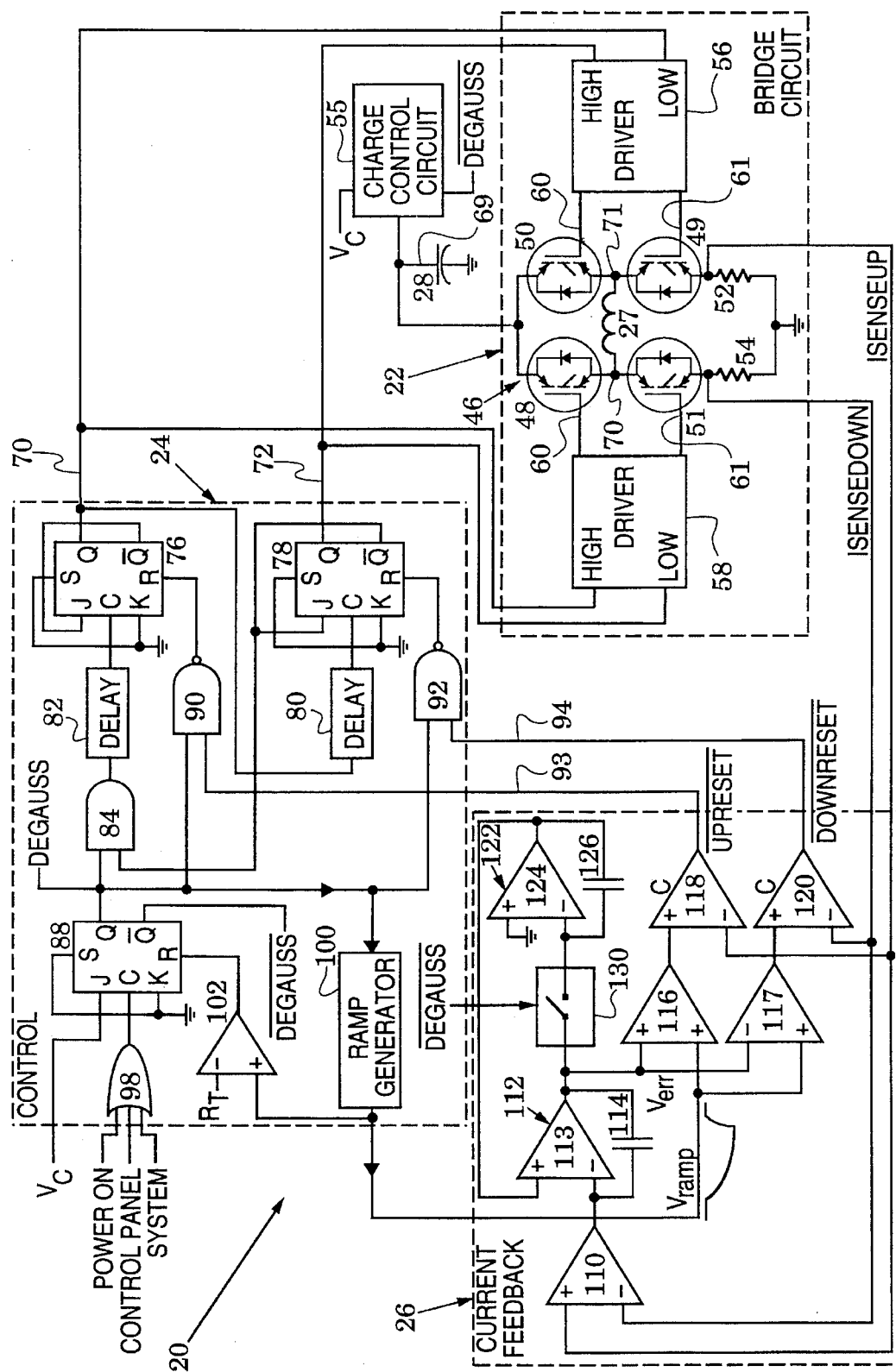
FIG. 1 is a schematic of a forced, resonant degaussing system in accordance with the present invention.

A forced, resonant degaussing system 20, in accordance with the present invention, is illustrated in FIG. 1. The system 20 includes a bridge circuit 22, a control circuit 24 and a current feedback circuit 26. The system 20 successively reverses the coupling in the bridge circuit 22 between a degaussing coil 27 and an energy source in the form of a storage capacitor 28 so as to generate oppositely directed degaussing currents through the coil. To enhance the alignment of shield domains in opposition with an ambient magnetic field, feedback signals are developed in the feedback circuit 26 and applied through the control circuit 24 to the bridge circuit 22 to successively decrease the coil's peak current magnitudes until they reach a predetermined threshold. Simultaneously, the feedback signals are adjusted to cause the time-integrated current in one direction of the coil 27 to substantially equal the time-integrated current in the other coil direction.

The novel coupling reversal facilitates the realization of an efficient degaussing system because, except for dissipative losses, the energy that is stored in the coil 27 in a latter portion of one coupling phase is resonantly returned to the storage capacitor 28 in an initial portion of a succeeding coupling phase. The natural frequency of this resonant energy recovery is forced by the system feedback to a frequency that obtains successively reduced coil currents and a time-integrated coil current which is substantially zero.

Figure 3:
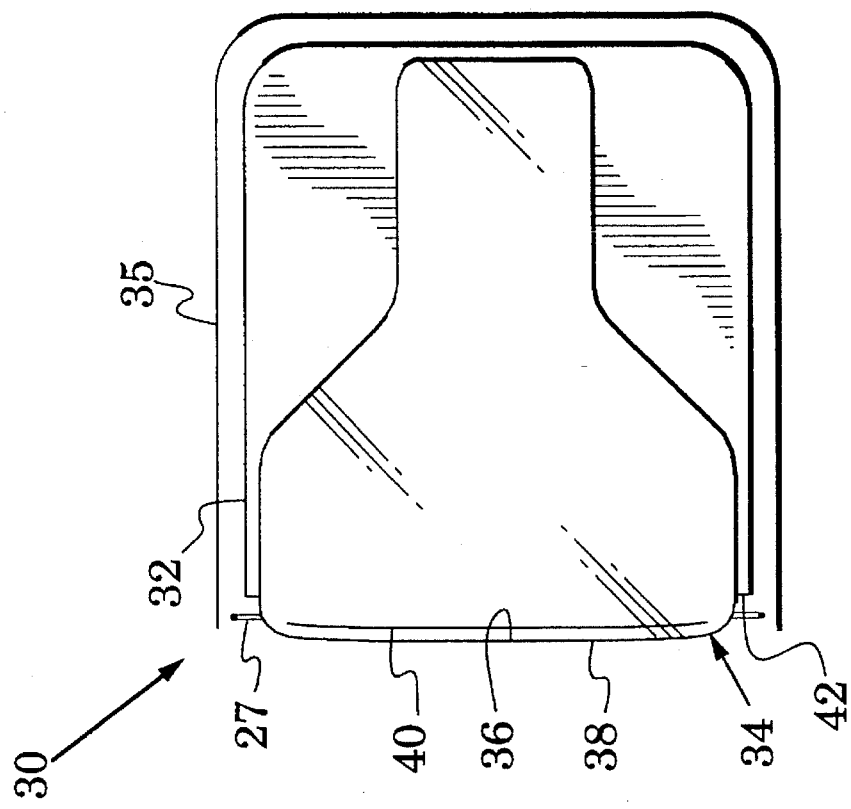
FIG. 3 is a view along the plane 3—3 of FIG. 2.
Figure 2:
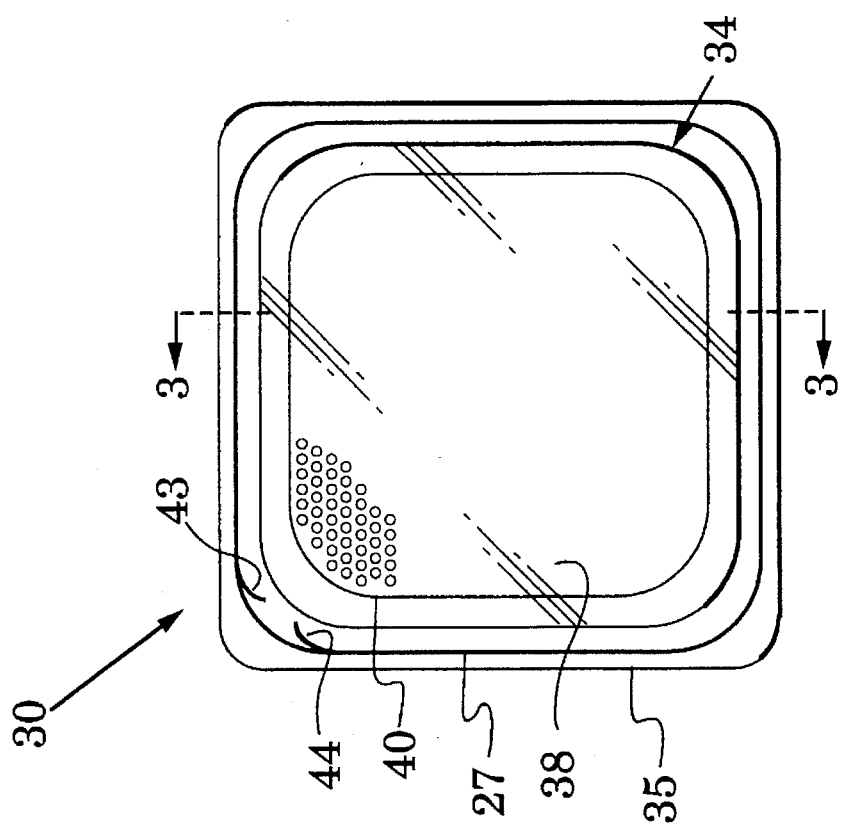
FIG. 2 is a front elevation view of a degaussing coil in association with a color monitor.

FIGS. 2 and 3 illustrate an arrangement of the degaussing coil 27 with a typical color monitor 30 and a high-permeability external metal shield 32. The monitor 30 includes a cathode-ray tube 34 that is mounted within a case 35. A phosphor-dot faceplate 36 includes phosphor dots which are usually carried in a triad pattern on the inner side of the face 38 of the tube 34 (alternatively, a separate phosphor-dot faceplate may be mounted adjacent the inner side of the tube face 38). A beam-directing device 40, e.g., a perforated shadowmask or an aperture grill, is spaced inwardly from the phosphor-dot faceplate 36 (for illustrative purposes, the beam-directing device will hereinafter be referred to as a shadowmask).

The external shield 32 is formed to generally enclose the tube 34 except for an opening 42 at one end which exposes the tube face 38 for viewing (for clarity of illustration, the shield is not shown in FIG. 2). The degaussing coil 27 is arranged to surround the tube 34 and lie approximately in the plane of the tube face 38. It is dimensioned to lie between the tube 34 and the case 35. The ends 43, 44 of the degaussing coil 27 are successively switched within the degaussing system 20 as indicated in the bridge circuit 22 of FIG. 1.

The external shield 32 is made from a high-permeability material that has a low hysteresis. This allows the domains of this shield to readily realign in opposition to altered orientations of an ambient magnetic field. The external shield 32 decreases the effects of ambient fields on the monitor's internal shield and shadowmask. However, orientation changes in large ambient fields will still require monitor degaussing to prevent display degradation.

The system 20 is described by directing attention initially to the bridge circuit 22 of FIG. 1. In this circuit, the coil 27 is connected across a full-bridge 46 that is formed of controllable switches 48, 49, 50 and 51. Current sensing resistors 52 and 54 are inserted respectively between the switches 49 and 51 and ground. The top of the bridge 46 is connected to the storage capacitor 28 which, in turn, is connected to a charge control circuit 55. The switches 50 and 49 respond to a driver 56 and the switches, 48 and 51 respond to a driver 58.

In the bridge embodiment 46, the controllable switches 48, 49, 50 and 51 are N-channel, enhancement-mode, insulated gate, bipolar transistors (IGBT) which each include an integral fast recovery diode. These transistors combine the high impedance of a MOSFET with the low on-state conduction loss of a bipolar transistor and are relatively inexpensive. Other suitable bridge embodiments can be formed with a variety of active switches, e.g., power MOSFETs or bipolar junction transistors, that preferably can withstand high voltage, e.g., 600 volts, and switch large currents, e.g., 24 amperes, in reasonable switching times, e.g., <900 nanoseconds.

A driver for the IGBTs of the bridge 46 is preferably designed for half-bridge topologies. An exemplary driver is the HIP2500 half-bridge driver/translator manufactured by the Harris Semiconductor Corporation, Melbourne, Fla., 32901. These driver types are designed to drive the high capacitance of IGBTs and power MOSFETs and provide the level translation required to be compatible with the upper (high) and lower (low) switches of a half-bridge. They typically have output drive ports 60 and 61 which respond respectively to logic signals at high and low input ports. In the bridge circuit 22, the drive ports 60 and 61 are connected to opposite gates of the upper switches 48 and 50 and the lower switches 50 and 51.

In operation of the bridge circuit 22, the storage capacitor 28 is initially charged, prior to a degauss cycle, by the charge control circuit 55. That is, the charge control circuit 55 is responsive to a—DEGAUSS signal. Completion of the charge is communicated to the rest of the system 20 by a logic signal $V_C$. After the capacitor 28 is fully charged, degaussing currents can be directed through the coil 27 by the bridge 46.

Figure 4:
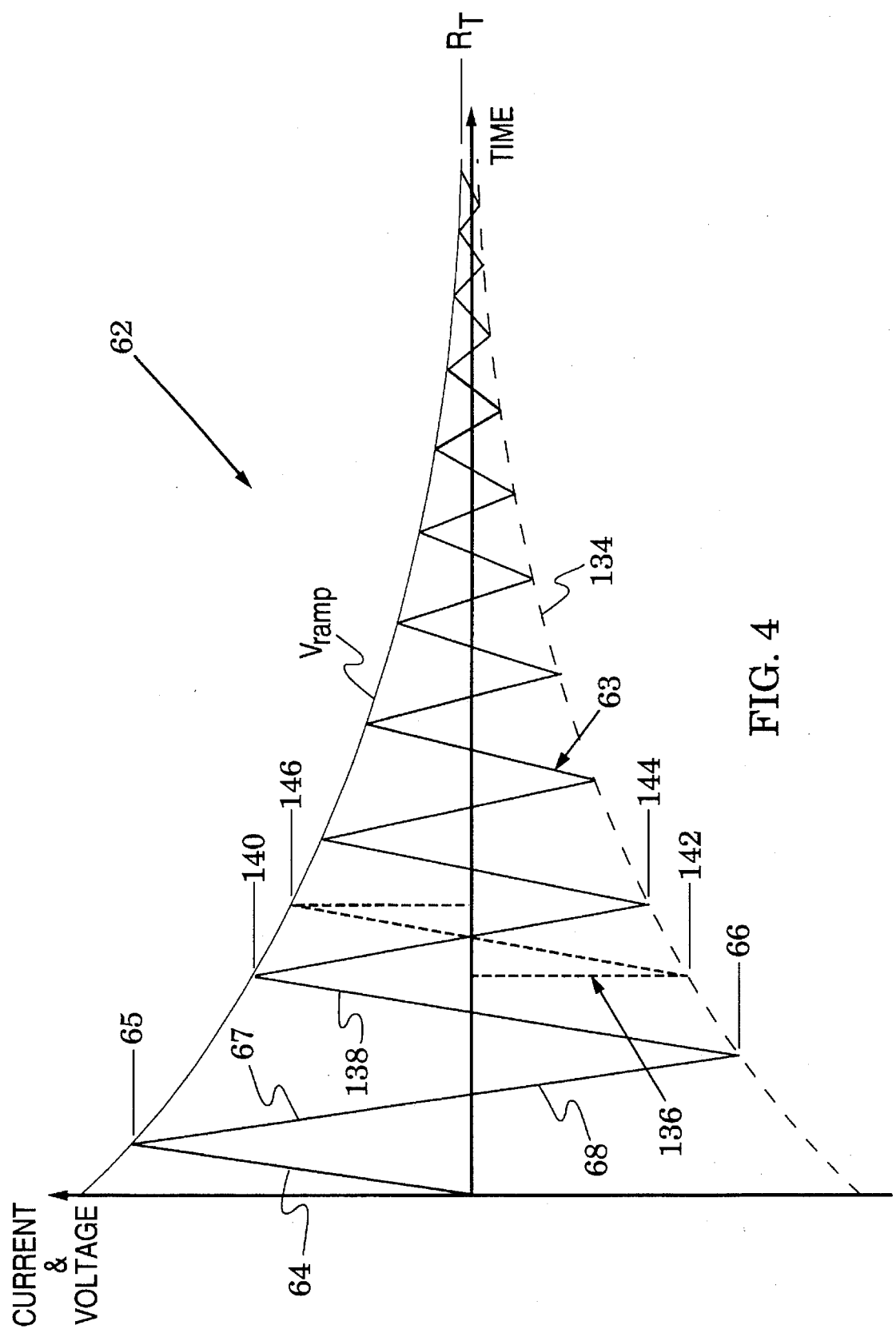
FIG. 4 is a graph of the current through the degaussing coil of FIGS. 2 and 3 in response to the system of FIG. 1.

The flow of these currents through the coil 27 can be demonstrated with two exemplary enable signals and the graph 62 of FIG. 4 which illustrates coil current 63 with respect to time. When a first enable signal is applied to the high input of driver 58 and the low input of driver 56, the coil 27 is coupled in series with the capacitor 28 through the switches 48 and 49 and the current sensing resistor 52. Current will begin to flow from the capacitor 28 through the coil 27 in accordance with V=L(dI/dt) in which V is the voltage on the storage capacitor 28 (less the voltage drop across the switches and the sensing resistor) and L is the inductance of the coil 27. This is shown as the current phase 64 in FIG. 4. Over a short time interval, V will be essentially constant so that the current slope dI/dt will also be constant as illustrated in the graph. Removal of the first enable signal will end this initial current phase 64 with the current having a magnitude 65.

If a second enable signal is immediately applied to the high input of driver 56 and the low input of driver 58, the coil 27 is coupled in series with the capacitor 28 through the switches 50 and 51 and the current sensing resistor 54. As shown in FIG. 4, the coil current decreases from an instantaneous magnitude 65 to zero and then increases, in the opposite coil direction, to a magnitude 66 at which point the second enable signal is removed. During the first portion 67 of this subsequent current phase, the current flows to the capacitor 28 and the energy transferred to the coil in the preceding current phase 64 is resonantly returned to the capacitor 28 less resistive losses. During the second portion 68 of this subsequent current phase, the coil's current magnitude increases from zero to the magnitude 66.

If one end of the storage capacitor 28 is arbitrarily designated to be an outlet port 69, and the coil 27 has first and second ends 70 and 71 as shown in FIG. 1, then it can be said that during the first enable signal, the coil 27 and the capacitor 28 are coupled in series with the outlet port 69 and the coil first end 70 adjacent. During the second enable signal, the coil 27 and the capacitor 28 are coupled in series with the outlet port 69 and the coil second end 71 adjacent.

As illustrated in FIG. 1, a voltage signal ISENSEUP, which is proportional to the current magnitude through switches 48 and 49, is developed across the sense resistor 52. A voltage signal ISENSEDOWN, which is proportional to the current magnitude through switches 50 and 51, is developed across the sense resistor 54.

Attention is now directed to the control circuit 24 which has a pair of JK flip-flops 76 and 78 that respectively generate signals on the control lines 70 and 72 which connect with the drivers 56 and 58 of the bridge circuit 22. The Q port of the flip-flop 76 is coupled to the clock port of the flip-flop 78 through a delay 80. The -Q port of the flip-flop 78 is coupled to the clock port of the flip-flop 76 through a delay 82. This latter coupling is also through an AND gate 84 that is enabled by a DEGAUSS signal from the Q port of a flip-flop 88. The reset port of the flip-flop 76 is coupled to the DEGAUSS signal by a NAND gate 90 and the reset port of the flip-flop 78 is coupled to this signal by a NAND gate 92.

The gates 90 and 92 also respectively receive -UPRESET and -DOWNRESET signals from the current feedback circuit 26 on control lines 93 and 94. The J port of the flip-flop 88 receives an enabling signal $V_C$ from the charge control circuit 55 and the clock port of this flip-flop receives degauss initiation signals through an OR gate 98. Each of the flip-flops 76, 78 and 88 have their set and K ports connected to ground. In addition, the J and -Q ports of flip-flops 76 and 78 are connected together. A ramp generator 100 receives the DEGAUSS signal and, in response, sends a ramp signal $V_{ramp}$ to the current feedback circuit 26. A comparator 102 delivers a reset signal to the flip-flop 88 when the ramp voltage drops below a ramp threshold $R_T$.

In operation, a degauss cycle is started through the JK flip-flop 88. This flip-flop is enabled by the capacitor charged signal $V_C$. After this signal is true, a degauss cycle is initiated by any signal applied to the OR gate 98. For example, these signals might include a POWER ON signal that is initiated automatically after turn on of an overall system which includes the degaussing system 20, a DEGAUSS signal from a control panel switch, and a SYSTEM signal that is initiated by the overall system.

In response to the DEGAUSS signal at the Q port of the flip-flop 88, the flip-flop 76 will cause the signal line 73 to go high after the delay time of the delay 82. This signal will remain true until the -UPRESET signal is received on the signal line 93. This latter signal resets the flip-flop 76 and after the time delay of the delay 80, the flip-flop 78 will cause the signal line 74 to go high. Because of the cross-coupling between the flip-flops 76 and 78, this process will continue in response to successive -DOWNRESET and -UPRESET signals. That is, once the flip-flop 88 has initiated a degauss cycle, alternating -DOWNRESET and -UPRESET signals from the current feedback circuit 26 will cause alternating signals on the control lines 73 and 74 which, in turn, cause opposite polarity currents through the degaussing coil 27.

In the control circuit embodiment 24, the ramp generator 100 discharges a capacitor through a resistor to generate an exponentially decreasing ramp signal $V_{ramp}$ which is shown in the graph 62 of FIG. 4. When the amplitude of $V_{ramp}$ drops below $R_T$ (also shown in FIG. 4), the comparator 102 resets the flip-flop 88 which ends the degauss cycle. After this termination of the degauss cycle, the charge control circuit 55 responds to the -DEGAUSS signal by recharging the capacitor 28 in preparation for the next cycle. Although an exponentially decreasing ramp signal has been described in this embodiment of the control circuit 24, the teachings of the invention may be practiced with other ramp signals, e.g., a linear ramp.

The successive signals on the control lines 70 and 72 are spaced apart in time by the time delay of the delays 90 and 92. This time delay insures that the switch pairs 48, 49 and 50, 51 are never on simultaneously. The time delay is greater than the turn-off time of the IGBT switches by a safe margin, e.g., 10 microseconds.

Attention is finally directed to the current feedback circuit 26. This circuit includes a summer 110 that sums the current sense signals ISENSEUP and ISENSEDOWN. The output of this summer is integrated by an integrator 112 (formed by a comparator 113 and a parallel capacitor 114) to form an error signal $V_{err}$. $V_{ramp}$ and $V_{err}$ are summed in summer 116 and the sum is applied as a reference to the comparator 118. A summer 117 forms the difference of $V_{ramp}$ and $V_{err}$, and applies the resultant signal as a reference to comparator 120 (the symbols of comparators 118, 120 are supplemented by the letter C). The signals ISENSEUP and ISENSEDOWN are compared in the comparators 118 and 120 against these references. The outputs of comparators 118 and 120 form the signals -UPRESET and -DOWNRESET which are coupled respectively to the gates 90 and 92 of the control circuit 24.

The output of the integrator 112 is compared to ground in an integrator 122 (formed of a comparator 124 and a parallel capacitor 126) and the output of the integrator 122 is coupled back to the input of the integrator 112. The output of the integrator 112 is coupled to the integrator 122 by a switch 130 which is controlled by the -DEGAUSS signal from flip-flop 88 of the control circuit 24.

In operation of the current feedback circuit 26, the signals ISENSEUP and ISENSEDOWN are compared in comparators 118 and 120 with a reference signal to develop the signals which cause the flip-flops 76 and 78 of the control circuit to change states. The reference, against which these current sensing signals is compared, is formed from the sum and difference of the $V_{ramp}$ and $V_{err}$ signals.

The feedback operation may be described by first assuming that the $V_{err}$ signal is zero. In this idealized case, the flip-flops 76 and 78 are reset by the -UPRESET and -DOWNRESET signals each time the ISENSEUP and ISENSEDOWN signals increase to the point that they equal the $V_{ramp}$ signal. Because the ISENSEUP and ISENSE-DOWN signals represent currents that flow respectively through the sensing resistors 52 and 54 of the bridge circuit 22, this feedback insures that the successive currents through the degaussing coil 27 are limited by the time-decreasing ramp signal $V_{ramp}$ which is supplied by the ramp generator 100.

The local domains of the monitor's internal magnetic shield and shadowmask 40 of FIGS. 2 and 3 will not completely realign to oppose the ambient field if the integral of the current through the degaussing coil 27 is not forced to be substantially zero over the degaussing cycle time. To insure that this time integral is zero, the current sense signals ISENSEUP and ISENSEDOWN are integrated by the integrator 112 to obtain the $V_{err}$ signal. $V_{err}$ represents the amp-second integral of current which has passed through the coil 27 in both directions. This $V_{err}$ signal modifies the $V_{ramp}$ signal to force the integral of current through the coil 27 to be substantially zero over the duration of the degaussing cycle. Without this correction, various voltage and timing errors through the system 20 could result in a non-zero amp-second integral which would leave the internal magnetic shield and shadowmask 40 with residual magnetism.

The $V_{err}$ signal should start each degauss cycle at zero because no current has passed through the degaussing coil at that time. However, $V_{err}$ may not be zero because of comparator offsets (e.g., offsets of operational amplifiers which may be used to realize the comparators), resistor initial tolerances and thermal drifts. Therefore, the integrator 112 includes a caging circuit which is formed by the feedback through the switch 130 and the integrator 122.

Between degaussing cycles, the switch 130 will be closed by the -DEGAUSS signal. The difference between the output signal of the integrator 113 and ground (i.e., a zero output) will be integrated by the integrator 122 and fed back as an error signal to the integrator 112. This error signal drives the output of the integrator 113 substantially to ground. Therefore, when a degaussing cycle begins and switch 130 is opened, the amp-second integral represented by the output of the integrator 112 will be zero as it should be. During the subsequent degaussing cycle, the integrator 122 holds its last error signal and this signal forms the reference for the integrator 113 during the degaussing cycle. The integrator 122 acts as a nulling integrator for the amp-second integrator 112 and its output is said to be "caged" during each degaussing cycle.

The combined operation of the bridge, control and feedback circuits 22, 24, and 26 produces the degaussing coil's current waveform 63 of FIG. 4. At the beginning of a degauss cycle a signal on the control line 73 turns on switches 48 and 49 and current flows through the coil 27 as indicated by the current phase 64. When the ISENSEUP signal, caused by current flow through the resistor 52, is equal to the reference at comparator 118, the flip-flops 76 and 78 change state. The switches 48 and 49 are turned off and after a delay set by the delay 80, a signal on the control line 74 turns on switches 50 and 51.

When the ISENSEDOWN signal, caused by current flow through the resistor 54, is equal to the reference at comparator 120, the flip-flops 76 and 78 again change state. The switches 50 and 51 are turned off and after a delay due to the delay 82, a signal on the control line 73 again turns on switches 48 and 49 and current flows through the coil 27 as indicated by the current phase portions 67 and 68. This sequence continues until the $V_{ramp}$ signal drops to $R_T$ which causes the comparator 102 to reset the flip-flop 88. This stops the degauss cycle.

During the interval between degauss cycles, the -DEGAUSS signal causes the charge control circuit 55 to recharge the storage capacitor 28. This signal also closes the switch 130 so that the nulling integrator 122 can develop a voltage at the input to the integrator 112 that nulls its output voltage. In addition, the ramp generator 100 is reset. For example, if the ramp generator forms its ramp by discharge of a capacitor through a resistance, then this capacitor is recharged during the interval between degauss cycles.

The $V_{ramp}$ voltage signal is shown in FIG. 4 and its mirror image is shown as the broken line 134. For clarity of illustration, the current 63 of the degaussing coil 27 is shown to reverse when it reaches the $V_{ramp}$ signal and the line 134. More accurately, the reversals of the coil current 63 occur when the ISENSEUP and ISENSEDOWN signals equal the $V_{ramp}$ signal.

An exemplary portion of the ISENSEDOWN voltage signal across the resistor 54 is illustrated as the broken line 136. The current phase 138 ends at a current magnitude of 140 when switches 48 and 49 are opened. As soon as the switches 48 and 49 turn off and during the time interval (due to the delay 80) before the switches 50 and 51 turn on, the stored energy of the degaussing coil 27 flows through the reverse diodes contained in the switches 50 and 51 until these switches are turned on.

After this short delay, switches 50 and 51 will reverse the coupling between the coil 27 and the capacitor 28. Therefore, current of magnitude 140 is now flowing up from ground and through resistor 54. This causes the ISENSEDOWN signal to drop to the level 142. As the coil current decreases to zero and then increases in the opposite direction to a magnitude 144, the ISENSEDOWN signal rises to the level 146 at which point the comparator 120 changes state. This causes the flip-flops 76 and 78 to change state. The switches 50 and 51 are opened and the ISENSEDOWN signal drops to zero. The ISENSEUP voltage signal follows a similar pattern.

As energy is resonantly exchanged between the capacitor 28 and the degaussing coil 27, losses are incurred in the resistors 52 and 54 and the switches 48, 49, 50 and 51 and the resistance of the degaussing coil 27. Thus, the voltage of the capacitor 28 decreases somewhat and the current slopes in FIG. 4 decrease as they approach the point at which $V_{ramp}$ equals the threshold $R_T$.

In the degaussing system 20 of FIG. 1, energy is recovered when coil current flows back to the storage capacitor. This resonant exchange of energy between the storage capacitor 28 and the degaussing coil 27 allows the degaussing cycle to be completed with considerably less energy than is typically used in nonresonant degaussing systems. Although an exemplary switching network in the form of a full-bridge 46 has been illustrated in the embodiment 20, it should be understood that a variety of other switching networks can be used to form other degaussing embodiments, e.g., switches arranged in a half-bridge.

Figure 5:
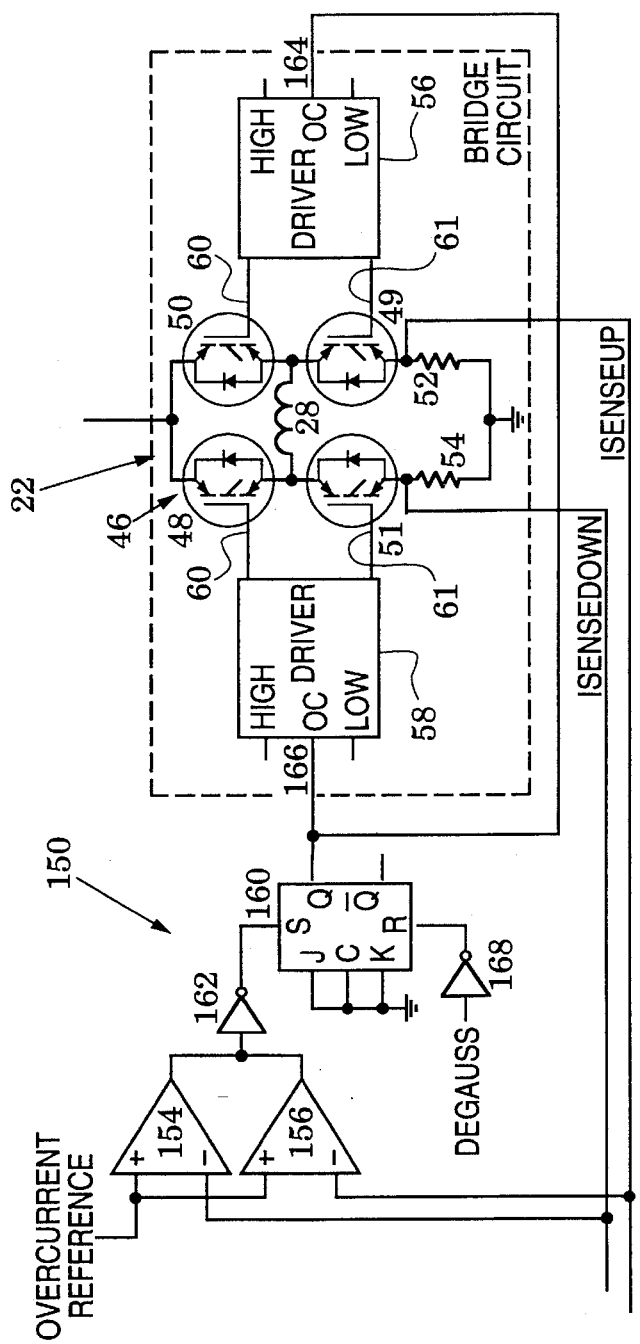
FIG. 5 is a schematic of an overcurrent protection circuit in the system of FIG. 1.

The system 20 is preferably protected from over-current conditions that might otherwise damage it or its associated monitor. In FIG. 5, an exemplary protection embodiment 150 is shown in association with the bridge circuit 22 of FIG. 1. The embodiment 150 has comparators 154 and 156 which are coupled to the set port of a flip-flop 160 through an inverter 162. The Q port of the flip-flop 160 is connected to overcurrent ports 164 and 166 of the drivers 56 and 58. Signals at these overcurrent ports turn off all of the switches 48, 49, 50 and 51. The J, K and clock ports of the flip-flop 160 are connected to ground. An inverter 168 couples the DEGAUSS signal to the reset port of the flip-flop 160.

In operation, the protection circuit 150 compares the ISENSEUP and ISENSEDOWN signals respectively with an OVERCURRENT REFERENCE voltage. This voltage can be set to correspond to a safe overcurrent, e.g., 20 amperes. An overcurrent signal to the flip-flop 160 causes all of the bridge switches to open. Prior to each degauss cycle, the flip-flop 160 is reset by the DEGAUSS signal through the inverter 168.

Figure 6:
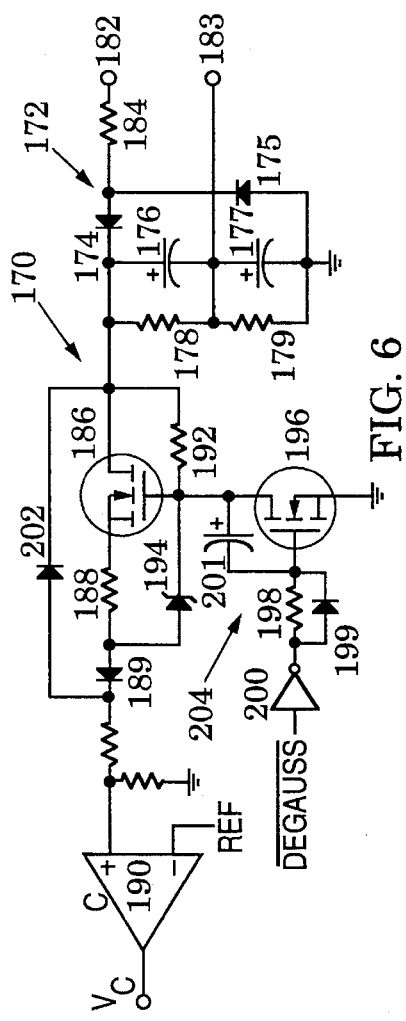
FIG. 6 is a schematic of a charge control circuit in the system of FIG. 1.

To reduce surge currents that might cause EMI problems in associated circuits, the charge control circuit 55 of FIG. 1 preferably charges the storage capacitor 28 with a controlled current. For example, FIG. 6 illustrates a current limited switch 170 which is connected to a voltage doubler 172 that is formed of diodes 174, 175, capacitors 176, 177 and resistors 178, 179. The doubler has input ports 182 and 183. A resistor 184 is in series with the port 182.

The current limited switch 170 includes an enhancement-mode MOSFET transistor 186 whose drain is connected to the doubler 172. Its source is connected through a resistor 188 and a diode 189 to a comparator 190 which generates the $V_C$ signal of the charge control circuit (55 in FIG. 1). A resistor 192 is connected between gate and drain and a zener diode 194 is connected between the gate and the junction of the resistor 188 and the diode 189. The gate is coupled through a driver 196 (another enhancement-mode MOSFET) to ground. The gate of the driver 196 connects to the signal -DEGAUSS through a resistor 198 and a parallel capacitor 199 and a series inverter 200. A capacitor 201 connects across the gate and drain terminals of the MOSFET 196. A fast discharge path is formed by a diode 202 around the switch 186, resistor 188 and diode 189. The MOSFET 196, resistor 198 and capacitor 201 form a Miller integrator 204. The diode 199, in parallel with the resistor 198, allows rapid turn-on of the transistor 196 but slow turn-off because of the Miller integrator effect.

In operation, the supply voltage for the switch 170 can be generated by an AC source connected between the doubler ports 182 and 183 or a DC source connected between the port 182 and ground. The DEGAUSS signal causes the driver 196 to rapidly pull the gate of the switch 186 to ground so that the switch 186 is off during the degauss cycle. The reverse biased diode 189 disconnects the charge circuit from the the storage capacitor (28 in FIG. 1). Between degauss cycles, the gate of the switch 186 is allowed to ramp up slowly by the action of the Miller integrator 204. The current through the switch 186 now charges the storage capacitor through the supply port 190.

The charging current will be limited to a current whose voltage drop across the source resistor 188 equals the lesser of the voltage of the zener diode 194 and the threshold voltage of the MOSFET switch 186 or the ramp generated by the Miller integrator 204. This current can be set to a value, e.g., 20 milliamps, that does not overstress the switch 186 nor generate significant EMI signals. When the system is turned off by removal of the source voltages at the ports 182 or 183, the storage capacitor safely discharges rapidly through the diode 202.

The structure of the current limited switch 170 and the doubler 172 insures that the charging of the storage capacitor (28 in FIG. 1) is regulated over changes in ambient temperature and variations in the source voltages. The comparator 190 output $V_C$ assures that the flip-flop 88 (in FIG. 1) is not enabled before the storage capacitor (28 in FIG. 1) is adequately charged.

An exemplary prototype of the forced, resonant degaussing system 20 has been realized with a 230 microfarad storage capacitor 28 that is charged to approximately 320 volts by the charge control circuit 55. In this prototype, the switches of the bridge circuit 46 are 24 ampere, 600 volt IGBT devices (Harris Semiconductor part number HGTG24N60DID) and the bridge circuit drivers 56 and 58 are Harris Semiconductor driver/translators, part number HIP2500. The resistance of the sensing resistors 52, 54 are each 0.1 ohm. The ramp generator 100 delivers a ramp that decays with an RC time constant of 30 milliseconds and the ramp threshold $R_T$ is set at approximately 4% of the ramp's initial voltage. The delays 80 and 82 of the control circuit 24 are set at 10 microseconds. Each degaussing cycle is completed in approximately 100 milliseconds. The circuit recharges and is ready for another degauss cycle in approximately 4 seconds.

The prototype was tested on a monitor which displayed a red, flat field in the presence of an ambient magnetic field that was adjusted to just start the loss of color purity. This was done to create a monitor with maximum sensitivity to degaussing artifacts. These tests indicated that the degaussing coil resistance should preferably not exceed 18.3 ohms at the highest operating temperature, e.g., 50° C. The prototype coil was formed with 150 turns of #23 AWG magnet wire with inside dimensions of 36.7 by 44.8 centimeters. The inductance of the coil was measured to be 35 millihenries when inside the external magnetic shield (32 of FIG. 3) and 31 millihenries when outside the shield. Its resistance was measured to be 16 ohms.

The preferred embodiments of the invention described herein are exemplary and numerous modifications, dimensional variations and rearrangements can be readily envisioned by those skilled in the art. Such variations and alternate embodiments are contemplated, and can be made without departing from the spirit and scope of the invention as defined in the appended claims.

I claim:

1. A degaussing system for degaussing a color cathode-ray tube, comprising:

an energy source having an outlet port;

a coil having first and second ends and arranged to have a magnetic field coupling with said cathode-ray tube;

a control circuit configured to successively generate first and second coupling commands; and a switching network arranged to couple said coil and said energy source in series with said first end adjacent said outlet port in response to said first coupling command and to couple said coil and said energy source in series with said second end adjacent said outlet port in response to said second coupling command;

the coupling between said energy source and said coil thereby producing successive, oppositely directed currents through said coil and successive, differently oriented magnetic fields.

2. The degaussing system of claim 1, wherein:

said switching network further includes a current sensor network configured to produce first and second sense signals which are proportional to the current through said coil when said outlet port is coupled adjacent respectively to said first and second coil ends; and said control circuit is further configured to generate said first and second coupling commands in response, respectively, to first and second feedback signals;

and further including a comparator circuit configured to generate said first and second feedback signals in response to the difference between a reference signal and said second and first sense signals, respectively.

3. The degaussing system of claim 2, wherein said reference signal is a ramp signal.

4. The degaussing system of claim 1, wherein:

said switching network further includes a current sensor network configured to produce first and second sense signals which are proportional to the current through said coil when said outlet port is coupled adjacent respectively to said first and second coil ends; and said control circuit is further configured to generate said first and second coupling commands in response, respectively, to first and second feedback signals;

and further including:

an error integrator arranged to produce an error signal that is proportional to the integrated difference between said first and second sense signals; and a comparator circuit configured to generate said first and second feedback signals in response to the difference between said second and first sense signals respectively and a modified reference signal that represents the difference between said reference signal and said error signal.

5. The degaussing system of claim 4, wherein said reference signal is a ramp signal.

6. The degaussing system of claim 4, further including:

a nulling integrator; and a caging switch arranged to couple said nulling integrator and said error integrator in a feedback loop that causes said error signal to be nulled.

7. The degaussing system of claim 1, wherein said energy source is a storage capacitor.

8. A display monitor system, comprising:

a color cathode-ray tube;

an energy source having an outlet port;

a coil having first and second ends and arranged to have a magnetic field coupling with said cathode-ray tube;

a control circuit configured to successively generate first and second coupling commands; and a switching network arranged to couple said coil and said energy source in series with said first end adjacent said outlet port in response to said first coupling command and to couple said coil and said energy source in series with said second end adjacent said outlet port in response to said second coupling command;

the coupling between said energy source and said coil thereby producing successive, oppositely directed currents through said coil and successive, differently oriented magnetic fields.

9. The monitor system of claim 8, wherein:

said switching network further includes a current sensor network configured to produce first and second sense signals which are proportional to the current through said coil when said outlet port is coupled adjacent respectively to said first and second coil ends; and said control circuit is further configured to generate said first and second coupling commands in response, respectively, to first and second feedback signals;

and further including a comparator circuit configured to generate said first and second feedback signals in response to the difference between a reference signal and said second and first sense signals, respectively.

10. The monitor system of claim 9, wherein said reference signal is a ramp signal.

11. The monitor system of claim 8, wherein:

said switching network further includes a current sensor network configured to produce first and second sense signals which are proportional to the current through said coil when said outlet port is coupled adjacent respectively to said first and second coil ends; and said control circuit is further configured to generate said first and second coupling commands in response, respectively, to first and second feedback signals;

and further including:

an error integrator arranged to produce an error signal that is proportional to the integrated difference between said first and second sense signals; and a comparator circuit configured to generate said first and second feedback signals in response to the difference between said second and first sense signals respectively and a modified reference signal that represents the difference between said reference signal and said error signal.

12. The monitor system of claim 11, wherein said reference signal is a ramp signal.

13. The monitor system of claim 11, further including:

a nulling integrator; and a caging switch arranged to couple said nulling integrator and said error integrator in a feedback loop that causes said error signal to be nulled.

14. The monitor system of claim 8, wherein said energy source is a storage capacitor.

15. A method of degaussing a cathode-ray tube, comprising the steps of:

arranging a coil to couple its magnetic field with said cathode-ray tube;

successively reversing the coupling direction of said coil with an energy source to generate successive currents through said coil in successively different directions; and resonantly receiving, with said energy source after each successive reversal, at least a portion of the current generated in said coil in the preceding coupling.

16. The method of claim 15, further including the step of initiating each successive coupling reversal to successively reduce the magnitude of current that is generated through said coil in the preceding coupling.

17. The method of claim 16, further including the step of stopping said successive reversing when the current magnitude reached during any coupling drops below a predetermined threshold.

18. The method of claim 16, wherein said initiating step includes the step of adjusting each successive coupling reversal to cause the time integrated current in one coil direction to substantially equal the time integrated current in the other coil direction.

19. The method of claim 15, further including the step of initiating each successive coupling reversal to cause the time integrated current in one coil direction to substantially equal the time integrated current in the other coil direction.

20. The method of claim 15, wherein said energy source is a storage capacitor.

\* \* \* \* \*